United States Patent Office 3,631,216
Patented Dec. 28, 1971

3,631,216
OLEFIN DEHYDRODIMERIZATION
Joseph Lipsig, Rosemont, Pa., assignor to Atlantic
Richfield Company, New York, N.Y.
No Drawing. Filed Apr. 4, 1966, Ser. No. 539,620
Int. Cl. C07c 3/20, 11/12
U.S. Cl. 260—680 R                          4 Claims

ABSTRACT OF THE DISCLOSURE

A dehydrodimerization process producing dienes and aromatic compounds by contacting an olefin stream containing acyclic olefins of three to four carbon atom as the sole reactant with a compound containing oxygen bonded to bismuth and active for the removal of a hydrogen atom from the terminal methyl group in said olefins.

---

This invention relates to olefin dehydrodimerization. In another aspect, this invention relates to a new process for the production of dehydrodimers of propylene and the butenes.

A number of polymerization processes for olefins are known as well as a number of processes directed specifically to the production of dimers. However, many of these processes are difficult to control producing low yields of the desired dimer. In other processes, there is an undesirable production of higher polymers ranging from trimers to solid polymers.

The following are objects of this invention.

An object of this invention is to provide an olefin dehydrodimerization process. A further object of this invention is to provide an olefin dehydrodimerization which is comparatively easily controlled and which makes possible the production of acyclic diolefins and aromatic compounds.

Other objects of this invention will be apparent to those skilled in the art upon reading this disclosure.

Broadly, my invention resides in a process which comprises contacting an olefin stream containing at least one acyclic olefin of 3 to 4 carbon atoms as the sole reactant with a compound containing oxygen bonded to bismuth and active for the removal of a hydrogen atom from a terminal methyl group in said olefin. Specifically, the dehydrodimer is formed by removing a hydrogen atom from the terminal methyl group of each of 2 olefins and the 2 olefins, less the hydrogen atom combine to form the dehydrodimer. In one example, propylene can be dehydrodimerized to produce 1,5-hexadiene. By changing the conditions, it is possible to produce benzene from the propylene. The control of these two products depends, to a large extent, upon the temperature level used in the process. The process is also applicable to the dehydrodimerization of isobutylene, 1-butene, and 2-butene (cis and trans). In such a case, octadienes or substituted benzenes can be produced. Preferably, a relatively pure olefin stream is used although streams of 90 percent purity are quite suitable. Alkanes appear to function as inerts. Preferably, the purity is above 95 percent. Mixtures of olefins can be used but this has the disadvantage of mixed products which can lead to separation problems.

The exact mechanism of the reaction is not fully understood. I prefer to start with sodium bismuthate, although the other alkali metal bismuthates can be used. These include potassium bismuthate, lithium bismuthate, etc. It is also possible to use bismuth oxide ($Bi_2O_3$) as the form of the bismuth compound at the beginning of the reaction. It is possible that the sodium bismuthate forms the above bismuth oxide during the reaction. Thus, I feel that the important consideration is the presence of the bismuth-oxygen bond in the compound and, using the starting materials set forth, such bismuth-oxygen bonds are active to remove one hydrogen atom from the terminal methyl group of the olefin.

The bismuth compound can be used in the solid form or it can be used on a support such as alumina, silica, and mixtures thereof.

The present invention should be distinguished from other processes in which olefins have been contacted with catalysts containing bismuth. In one of these, a mixture of the olefin and oxygen is treated with the catalyst to produce oxidative dehydrogenation. An example is conversion of 1-butene to 1,3-butadiene. In my process the olefin or mixtures of olefin is the sole reactant.

My invention should also be distinguished from the production of acrolein using compounds such as bismuth molybdate. In such a process, the feed comprises a mixture of the oxygen and the olefin wherein the oxygen adds to the molecule.

As pointed out above, the reaction can lead to the acyclic diolefin or the aromatic compound. While both products are of value, I presently feel that the invention will find its greatest use in the production of the diene. The hexadienes and octadienes have recently become of increased value as the third monomer in the production of ethylene-propylene rubbers. The use of such monomers permits the production of a vulcanizable composition. From my work, I believe that temperature control provides the best method for regulating production of the acyclic compound or the aromatic compound. Broadly, the reaction is carried out at temperatures from 300–650° C. although the most useful range is from 425–525° C. Below 425° C. the reaction is slow and above 525° C. benzene and other aromatics are the primary products. Further, in the upper portion of the temperature range there is some carbon formation.

My work has not indicated that pressure has a great effect on the reaction. I prefer to operate in the vapor phase and the pressure can range from approximately 4 p.s.i.a. to 5 or more atmospheres.

Also, the flow rate of the olefin over the bismuth compound can vary over comparatively wide ranges. Thus, suitable results can be obtained with a ratio of 0.1 to 50 cubic centimeters per minute per gram of the bismuth compound. The range of 0.2 to 30 cubic centimeters per minute per gram is preferred. Best control of the reaction is obtained in the range of 1/1 to 3/1 on the same basis. The flow rate does have some effect upon the product distributon. Within the preferred range, a higher flow rate is more selective toward the diolefins but gives lower overall conversion.

During the reaction, when sodium bismuthate is used, the compound is reduced to bismuth oxide and bismuth metal. The sodium is converted to sodium hydroxide or sodium carbonate, the latter resulting from the reaction between the hydroxide and carbon dioxide. When bismuth oxide is used, the reduced product is bismuth. Thus, it is apparent that the process should be operated as a cyclic process with periodic regeneration of the bismuth oxide. Regeneration is possible with a free oxygen containing gas. Air is quite suitable although other oxygen containing gases, such as enriched air, can be used. The process can be operated continuouly with a plurality of reactors, at least one being used for the reaction while another is being regenerated. Between the reaction and regeneration step, it is preferable to flush the reactor with an inert gas, such as nitrogen, carbon dioxide, or flue gas, to prevent the formation of explosive mixtures.

Following reaction, the products are separated and the unreacted olefins recycled to the reaction zone. The difference in boiling points of the products permit separation without great difficulty.

The following examples illustrate specific embodiments of my invention. They are given by way of example and should not be considered unduly limiting.

EXAMPLE 1

In this example, 10 grams of sodium bismuthate were placed in a ½ inch glass tube as the reactor. Sintered glass discs were used as supports for the bismuthate and temperature was measured with a thermocouple in a concentric temperature well. Propylene was passed through the reactor at a rate of 10 cubic centimeters per minute at a temperature of 500° C. for a reaction period of 30 minutes. From the reaction zone, the products were conveyed to a Dry-Ice-acetone bath which removed liquid products and then to a liquid nitrogen trap for recovery of the gaseous products. An analysis of the liquid products gave 31 percent conversion of the propylene, the products being 38 percent 1,5-hexadiene, 54 percent benzene and 8 percent other products all on a weight basis.

At the conclusion of this run, the solid material in the tube was olive green in color. It was regenerated by flowin oxygen through the tube until the whitish color returned. Thereafter additional propylene was passed through the tube for 30 minutes at 500° C., the flow rate being 10 cubic centimeters per minute. 23 percent conversion of the propylene was obtained, the products on a weight basis being 63 percent 1,5-hexadiene, 29 percent benzene and 8 percent other products.

EXAMPLE 2

Using the same reaction vessel as that described in Example 1, a number of additional runs were made to illustrate the effect of flow rate, reaction temperature, and reaction time. In each run, 10 grams of sodium bismuthate was used. The results are shown in the following table.

EXAMPLE 3

When the procedure of Example 1 was repeated using either 1-butene or 2-butene, products containing octadienes and substituted benzenes were produced.

EXAMPLE 4

The first portion of Example 1 was repeated using $Bi_2O_3$ as the contact material. Conversion of the propylene to 1,5-hexadiene resulted.

Obviously, those skilled in the art will recognize that many modifications and variations of the invention can be made and these should be considered as coming within the broad scope of the invention.

I claim:
1. A dehydrodimerization process which comprises producing dienes and aromatic compounds by contacting an olefin stream containing at least one acyclic olefin of three to four carbon atoms as the sole reactant with a compound cotnaining oxygen bonded to bismuth and active for the removal of a hydrogen atom from a terminal methyl group in said olefin at least at the initial stage of contacting, said compound containing oxygen bonded to bismuth being reduced during the process, wherein the process temperature is 425 to 525° C. and the process pressure is 4 p.s.i.a. to 5 atmospheres.

2. The process of claim 1 wherein the olefin is propylene, the bismuth containing compound is sodium bismuthate, and the product of the process is 1,5-hexadiene.

3. The process of claim 1 wherein the olefin is a $C_4$ olefin, the bismuth containing compound is sodium bismuthate, and a product of the process is an octadiene.

4. A process for the synthesis of compounds of the formula $CH_2=C(R)CH_2CH_2C(R)=CH_2$, wherein R is H or $CH_3$, which comprises passing a gas containing an olefin having the formula $CH_2=C(R)CH_3$ whre R is H or $CH_3$ as the only component reactive under the process conditions, through an oxidant bed comprising bismuth oxide held at dehydrodimerization temperatures.

| Run | Propylene flow rate, cc./min. | Temp., °C. | Reaction time, minutes | Propylene conversion, percent | Product distribution, percent wt. basis | | |
|---|---|---|---|---|---|---|---|
| | | | | | 1,5-hexadiene | Benzene | Other |
| 1 | 10 | 450 | 30 | 17 | 50 | 40 | 10 |
| 2 | 5 | 450 | 120 | 21 | 42 | 51 | 7 |
| 3 | 10 | 475 | 60 | 28 | 55 | 35 | 1 |

References Cited
UNITED STATES PATENTS
2,171,207   8/1939   Boultbee ——————— 260—683.15
2,408,139   9/1946   Gutzeit ——————— 260—680
2,678,904   5/1954   Kearby et al. ——— 260—683.15 X PAUL M. COUGHLIN, Jr., Primary Examiner U.S. Cl. X.R.
260—673